UNITED STATES PATENT OFFICE.

JORDAN HOMER STOVER, OF TRENTON, NEW JERSEY.

PROCESS OF TREATING SILICIOUS MINERALS FOR THE PRODUCTION OF CHEMICAL COMPOUNDS.

1,283,951. Specification of Letters Patent. Patented Nov. 5, 1918.

No Drawing. Application filed June 22, 1914. Serial No. 846,560.

*To all whom it may concern:*

Be it known that I, JORDAN HOMER STOVER, of Trenton, in the county of Mercer and State of New Jersey, have invented certain new and useful Improvements in Processes of Treating Silicious Minerals for the Production of Chemical Compounds, whereof the following is a specification.

My invention contemplates particularly the treatment of feldspar, various alkali metal or alkaline earth metal silicates of alumina, and other silicious rocks, in such manner that compounds of the alkali metal, alkaline earth metals, and other elements, and also silica, may be obtained economically on a commercial scale.

Most of the processes for this purpose that hitherto have been attempted have not been suitable for commercial operations, owing to the formation of uncommercial by-products, or on account of incomplete reactions, the employment of expensive reagents, waste of energy or loss of material, which disadvantages have prevented their practical applications.

In my process I take a silicious mineral, or a silicious rock which contains sufficient amounts of the essential elements of the compounds which I am desirous of obtaining, for instance, orthoclase, if I most desire potash; lepidolite if lithia, or other rocks that give satisfactory yields of the compounds which I desire, and increase the basicity of the silicates present in the selected material. I then decompose the silicates of increased basicity thus formed, and treat the products as hereinafter described, in order to extract the desired components.

As a typical illustration of my process in its preferred form, in case the selected mineral comprises a potash base, for instance, orthoclase having the accepted formula of ($K_2O.Al_2O_3.6SiO_2$), I proceed as follows: The mineral is pulverized until it will pass through an eighty mesh screen, it is then mixed with an alkali metal carbonate, hydrate, or oxid, or I may use any ceramic flux, and is preferably fused at a red heat. I find that a good fusion mixture consists of one part of orthoclase to one and one half parts of potassium carbonate ($K_2CO_3$), and, if desired, powdered coal or other combustible may be added to assist the fusion. I may, however, heat this mixture to a much higher or lower temperature than that above indicated; in fact, if the rock is very finely pulverized, say, to 200 mesh, the reactions may be accomplished by sintering. Hence, I use the term "fusion" as comprehensive of sintering. If any alkali is volatilized, it can be condensed in the furnace stack and recovered.

When the mass is fused, it is run into water, and agitated until the melt is disintegrated, a jet of steam, or compressed air, being employed to assist the agitation, if desired. This puts in solution potassium carbonate, potassium hydrate, and potassium silicate, and leaves suspended a finely divided silicate of potash and alumina, which is decomposable by acid.

The reactions which take place in the steps as described may, of course, vary, according to the characteristics of the initial material that is selected and according to the equivalency and characteristics of the basic reagents used, but, in general, it may be said that silicates of a higher basicity are formed. When the resultant silicates react with the water, hydrolysis takes place, forming hydrated silicates and liberating, in solution, such soluble constituents as are formed.

In the particular instance above mentioned, some of the more important reactions may be stated, as follows, using the accepted formulæ:—

The fusion:

(# 1) 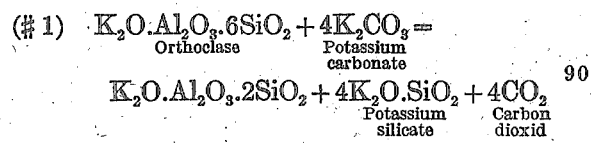

If, as is frequently the case, when the orthoclase is associated with quartz the following additional reaction occurs:

(# 2) 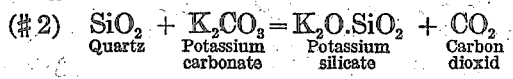

These reactions may be conveniently formulated in the following general equation, viz:

(#3) $MO$ = Total of alkali metal oxids ($R_2O$), alkaline earths and metal protoxids ($RO$), present in molecule.
$R_2O_3$ = Total sesqui-oxids present in molecule.
$aq$ = Chemically combined water.
$a, b, c, d, e, f$ = Numerical coefficients.
$$aMO.bR_2O_3.cSiO_2 + dMO = (a+d-e)MO.bR_2O_3.)c-f)SiO_2 + eMO.fSiO_2.$$

The hydrolysis:

(#4) $K_2O.Al_2O_3.2SiO_2 + K_2O.SiO_2 + 3H_2O =$
  Potassium silicate   Water $K_2O.Al_2O_3.3SiO_2.2H_2O + 2KOH$
  Potassium hydrate (#5) $K_2O.SiO_2 + 8H_2O = K_2SiO_3.8H_2O.$ In case it is desired to remove any silica which is held in solution as soluble silicate, this can be done by adding an amount of a solution of a soluble aluminate, equivalent to react with the quantity of silica in solution, thus precipitating a hydrated alkaline silicate of alumina, which, after being precipitated, may be filtered out. For instance, in case pure orthoclase feldspar is taken, the amount of potassium aluminate necessary to bring about the last mentioned precipitation for each 100 lbs. of feldspar is 180 lbs.

The type of this reaction is as follows:

(#6) $3(K_2O.SiO_2.8H_2O) + K_2O.Al_2O_3.3H_2O =$
  Potassium silicate   Potassium aluminate $K_2O.Al_2O_3.3SiO_2.2H_2O + 6KOH + 22H_2O$
  Potassium hydrate   Water While this satisfactorily precipitates the silica, it is my preference to accomplish this by the employment of carbon dioxid gas which precipitates the silica as silicic acid when the mixture is carbonated.

(#7) $K_2OSiO_2.8H_2O + CO_2 =$
  Potassium meta-silicate   Carbon dioxid $K_2CO_3 + H_4SiO_4 + 6H_2O$
  Potassium carbonate   Ortho-silicic acid   Water The residue is filtered out and washed, and the solution, which is mainly potassium carbonate, will yield the potassium carbonate when the solution is evaporated and allowed to crystallize, or it may be evaporated to dryness and utilized in making the next fusion mixture.

The residue obtained in any of the before described manners is then treated with an acid, one which forms soluble salts with the fluxes or basic part of the silicates being preferred. Chamber sulfuric acid does well if there are but small quantities of the alkaline-earth metals present, though if there are large amounts of these elements in the rock, I find an acid which forms soluble salts with these elements, such as hydrochloric acid, is to be preferred. This treatment decomposes the residue forming the soluble acid salts of potash and alumina, and other bases present, and leaves behind silicic acid.

Examples of the acidulation reactions are as follows:

(#8) $K_2O.Al_2O_3.3SiO_2.2H_2O + 4H_2SO_4 + 21H_2O = K_2Al_2(SiO_4)_4.24H_2O + 3H_2SiO_3$ (#9) $K_2SiO_3.8H_2O + H_2SO_4 = K_2SO_4 + H_4SiO_4 + 7H_2O$

When the insoluble basic silicates are treated with an acid or acids which form soluble compounds with the silicate bases, the silicates are decomposed with the formation of silicic acid and salts of the acid used. These products may be now separated and converted into desired commercial forms by any of the means known to those versed in these arts. As an incident to the foregoing process, I obtain the silicic acid in such a condition that it can be filtered out and converted into water glass by boiling or digesting with alkali, the following being a typical formula:

(#10) $4H_4SiO_4 + 2NaOH = Na_2O.4SiO_2 + 9H_2O$

On the other hand, if preferred, the alumina can be precipitated by means of potassium hydrate, or by employing some of my first solution before referred to, and can be filtered out with the silica. The alumina can then be dissolved by an acid, and after filtering, the silica will remain in such form that it will readily form water glass, on boiling or digesting with alkali. If any decomposed rock remains, it can be filtered out at this stage and returned to the next fusion.

Returning now to the original statement of my invention, I desire to point out the following further facts:

Having thus described the typical embodiments of my general process, I wish it to be understood that it is not limited to the initial material, nor to the described reagents, since other rocks containing the required constituents may be used, and chemical equivalents of such reagents as I have mentioned may be employed. Furthermore, there may be a wide variation in the proportions, without departing from the essential principle of my invention.

In my claims I employ the term silicious mineral to indicate the general class of substances constituting the initial material, it being understood that said term is broadly comprehensive of natural mineral compounds which contain silica, whether such compound be a single, definite mineral, such as orthoclase, or a more complex aggregation, such as is found in rocks, as for instance, granite.

Having thus described my invention, I claim:

1. The process of treating silicate minerals which consists in fusing the mineral with an alkali metal base to effect formation of an insoluble, decomposable, compound silicate, leaching out the soluble products of said fusion, and decomposing the insoluble residue with acid.

2. The process of treating silicate minerals which consists in fusing the mineral with an alkali metal base to effect formation of an insoluble, decomposable, compound silicate, leaching out the soluble products of said fusion, decomposing the insoluble residue with acid, removing the soluble products of decomposition and digesting the residue with an alkali metal base.

3. The process of treating silicate minerals which consists in fusing the mineral with an alkali metal base to effect formation of an insoluble, decomposable, compound silicate, leaching out the soluble products of said fusion and decomposing the insoluble residue with sulfuric acid.

4. The process of treating silicate minerals which consists in fusing the mineral with an alkali metal base to effect formation of an insoluble, decomposable, compound silicate, leaching out the soluble products of said fusion, decomposing the insoluble residue with sulfuric acid, removing the solution of sulfates thus formed, and digesting the insoluble residue with an alkali metal base.

5. The process of treating silicate minerals which comprises fusing the mineral with an alkali metal base to effect formation of an insoluble, decomposable, compound silicate, separating said silicate and treating it with acid.

6. The process of treating silicate minerals which comprises fusing the mineral with an alkali metal base to effect formation of an insoluble, decomposable compound silicate, separating said silicate and treating it with sulfuric acid.

In testimony whereof, I have hereunto signed my name at Philadelphia, Pennsylvania, this nineteenth day of June 1914.

JORDAN HOMER STOVER.

Witnesses:
 HENRY N. PAUL, Jr.,
 JAMES H. BELL,
 E. L. FULLERTON.